Sept. 1, 1936. W. W. CRILEY 2,052,752
TIMING AND CONTROL MECHANISM
Filed Oct. 7, 1933 3 Sheets-Sheet 1

INVENTOR
William W. Criley,
BY
Justin W. Macklin,
ATTORNEY

Sept. 1, 1936.  W. W. CRILEY  2,052,752
TIMING AND CONTROL MECHANISM
Filed Oct. 7, 1933  3 Sheets-Sheet 2

INVENTOR
William W. Criley,
BY
Justin W. Macklin,
ATTORNEY

Sept. 1, 1936. W. W. CRILEY 2,052,752
TIMING AND CONTROL MECHANISM
Filed Oct. 7, 1933 3 Sheets-Sheet 3

INVENTOR
William W. Criley,
BY
Justin W. Macklin,
ATTORNEY

Patented Sept. 1, 1936

2,052,752

UNITED STATES PATENT OFFICE 2,052,752

TIMING AND CONTROL MECHANISM

William W. Criley, Cleveland, Ohio

Application October 7, 1933, Serial No. 692,661

11 Claims. (Cl. 192—132)

This invention relates to a timing and control mechanism for controlling the operation of metal forming machines such as upsetting, forging, sheet-metal forming machines and the like.

Generally stated, it is an object of this invention to provide a simple timing or control mechanism for controlling machines of the character referred to and which provides for effecting and controlling continuous, intermittent or "inching" operation of the machines, and for locking the machines in idle position when working thereon or changing the die set-up.

Another object is to provide a control or timing mechanism which is readily adapted to have included therewith safety means for the protection of operators attending the machines.

Another object is to provide a control mechanism having conveniently located actuating or initiating means which provides for full control of the operation of the machine at all times by a single operator.

Another object is to provide a control mechanism which may have embodied therein means responsive to an abnormal operation, such as the jamming or clogging of work pieces in dies, of a machine controlled thereby, to stop the machine on the occurrence of such an abnormality.

Other and more specific objects will be apparent from the following description which is taken in connection with the attached drawings, in which Fig. 1 is an elevation, partly in section, showing one embodiment of my invention.

Figure 1:
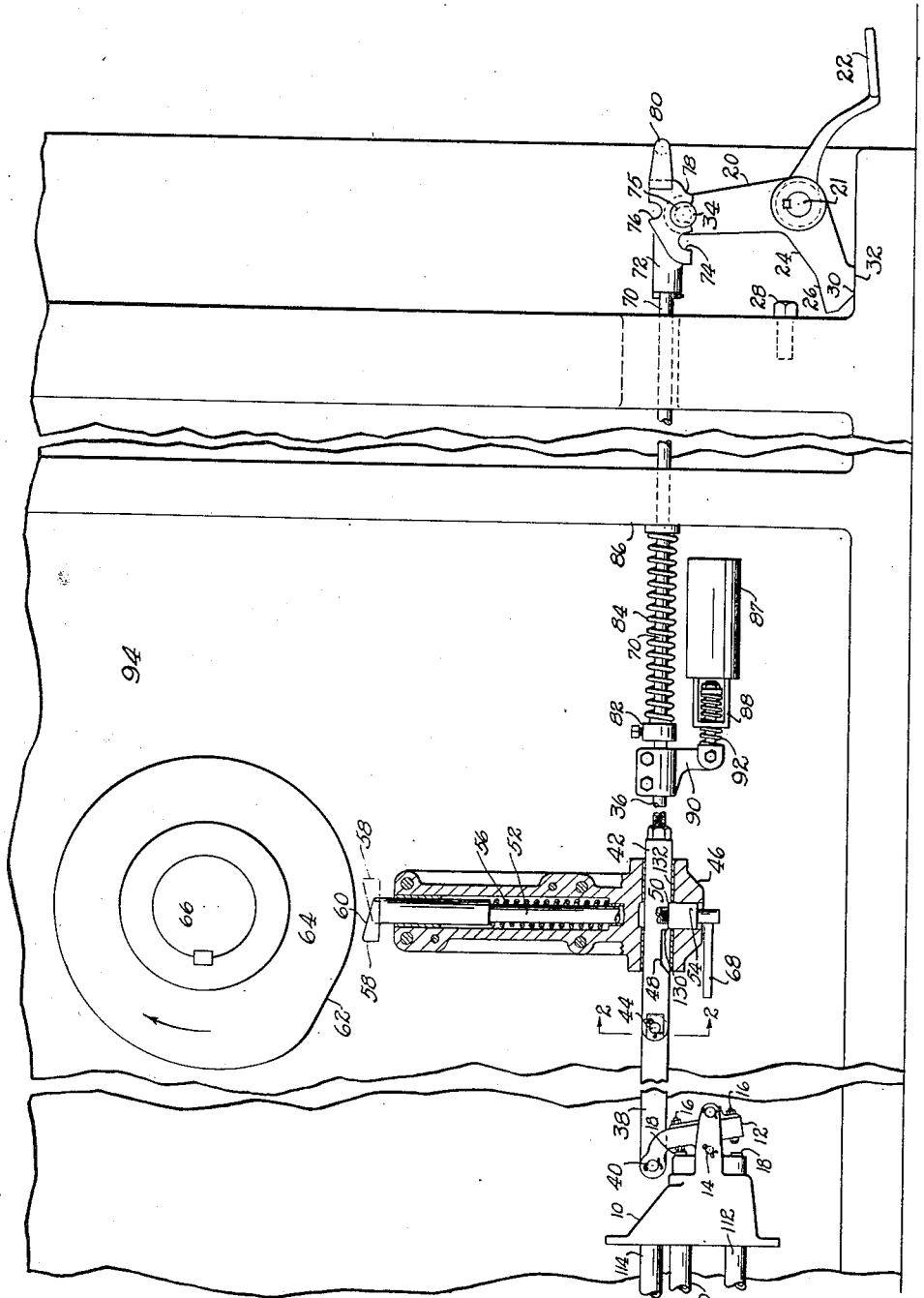
Figure 2:
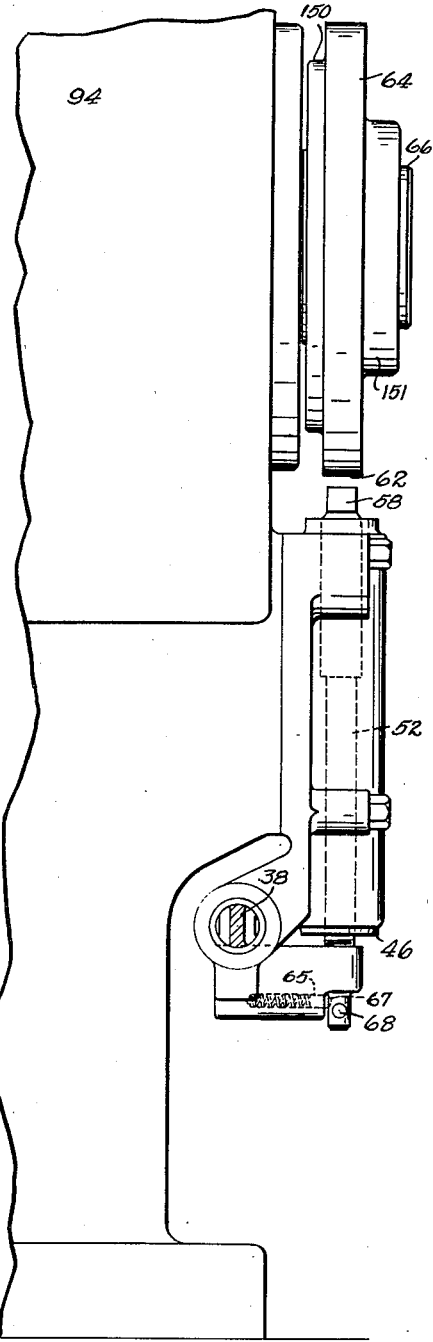
Fig. 2 is an end elevation of the view in Fig. 1 taken along the line 2—2.
Figure 3:
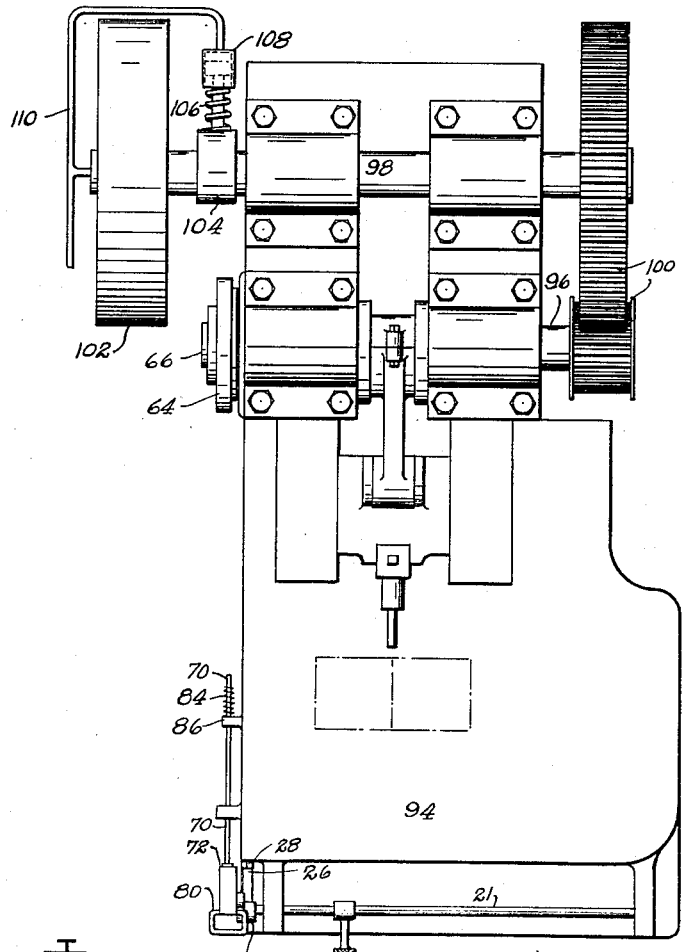
Fig. 3 is a plan view of a forging machine showing in somewhat fragmentary form the adaptation of this form of my invention thereto in connection with the operation of a pneumatic clutch and brake.

Referring now to Figs. 1, 2 and 3, I have shown a fluid controlling valve 10 having an actuating arm 12 pivoted as at 14 and having associated therewith adjustable pins 16 adapted to act against suitable valve actuating rods 18.

An operating lever is shown at 20 as rigid with a shaft 21. Also rigid with the shaft 21 but positionable therealong is a foot treadle 22. Rigid with the operating arm 20 may be a stop arm 24. The stop arm 24 may have a stop face 26 adapted to engage a stop bolt 28, and another stop face 30 adapted to engage a stop surface 32 of a machine supporting the shaft 21.

The operating lever 20 may have associated therewith a pin 34, the purpose of which will hereinafter appear.

Connecting the valve actuating arm 12 to the operating lever 20 is shown a link mechanism 36. This mechanism may include a link member 38 connecting with the valve actuating arm 12 as by a pin 40. A latch plunger pin 42 may be slidable in a latch supporting housing 46. The plunger pin 42 may have notches 48 and 50 cut therein adapted to permit limited vertical movement of a latch pin 52 by engagement of a latch block 54 rigid therewith with the notches 48 and 50. The latch pin 52 is normally urged upwardly by action of a spring 56. The upper end of the latch pin 52 has rigid therewith a wedge shaped cam engaging member 58 adapted to have its upwardly presented face 60 engaged by a cam face 62 of a cam 64, which is rigid with a shaft 66. The shaft 66 may be the main crank shaft of a metal forming machine, such for example as an upsetting or sheet metal forming machine, or it may be any other suitable shaft geared thereto and working in timed relation therewith.

The lower end of the latch pin 52 may have associated therewith a pin lever 68, adapted to rotate the latch pin 52. The latch pin 52 is preferably threaded into the latch block 54, so that on turning of the pin lever 68 the latch pin 52 is rotated, permitting the cam engaging member 58 to be moved through 180°, from the position shown in full lines to that shown in dotted lines. A spring pressed plunger 65 may cooperate with recesses 67 in the lower end of the latch pin 52 to hold the latch pin in either of the two positions of the cam engaging member.

The latch plunger pin 42 may have adjustably connected therewith a connecting treadle rod 70 with one end of which may be rotatably associated a variable connecting link member 72. This member 72 preferably has a plurality of notches 74, 75 and 76, as well as a curved or notched shoulder 78. The purpose of these notches and shoulder is to provide predetermined definite, variable connections between the treadle rod 70 and the actuating lever 20 by interfitting the notches with the pin 34. A handle 80 integral with the member 72 is provided to permit of easy rotation thereof and in order to quickly effect the variable connections between the treadle rod 70 and the actuating lever 20.

The treadle rod 70 may have a collar 82 adjustably secured thereto and concentric therewith a spring 84 adapted to react against a surface of a connecting rod supporting rib 86. The purpose of the spring 84 is to normally urge the entire link mechanism 36 to the left, so as to cause a counter-clockwise rotation of the valve actuating arm 12 on its fulcrum pin 14.

A solenoid 87 may have its plunger member 88 connected to the treadle rod 70 as by a clamp or link member 90 through a reaction spring 92.

Referring now to Fig. 3, there is shown an upsetting or heading machine 94 having a main crank shaft 96 suitably geared to a countershaft 98 through gearing 100. The countershaft 98 may have associated therewith a pneumatic or fluid actuated clutch 102. This clutch may also serve as a pulley and be belted to or otherwise connected with a prime mover. Also the countershaft 98 may have similarly associated therewith a brake mechanism 104 adapted to be normally set by action of a spring 106 but having a fluid actuated means 108, such for example as a cylinder and piston, adapted to release the brake upon the admission of a suitable pressure fluid thereto. Fluid pressure may be admitted to the clutch 102 and the brake releasing means 108 by the pipe line 110. The details of the clutch and brake mechanisms are not shown as such details are not primarily a part of this invention and such mechanisms are well known in the art. The fluid line 110 may be connected to the similarly numbered line 110 associated with the fluid valve 10 (Fig. 1) and a fluid under pressure may be admitted to the valve through the feed line 112. An exhaust line 114 may form a part of the valve, and be adapted to release or exhaust any pressure in the clutch or brake mechanism upon closure of a valve admission port connecting with the feed line 110.

Figure 5:
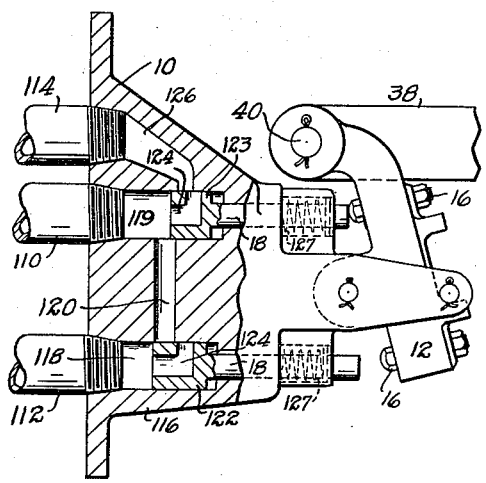
Fig. 5 is an enlarged cross sectional view of one form of fluid controlling valve which may be used in connection with my invention.

The details of one form of fluid controlling valve which may be used in connection with this invention is shown in Fig. 5. As there shown, the valve comprises a body portion 116 having annular orifices 118 and 119 connected by a duct 120. In the orifices are pistons or plungers 122 and 123, each being apertured axially and radially as at 124. The pistons or plungers 122 and 123 are each respectively integral with a rod or pin 18, which pins or rods are adapted to be actuated against pressure of springs 127 by contact with the adjustable pins 16 in the valve actuating arm 12. The fluid valve may also have a duct 126 connecting with the exhaust line 114. The actuation of the valve in connection with the link mechanism will now be described.

The notches 74, 75 and 76, and the notched shoulder 78 may be made to correspond to certain operations, as for example the notch 74 may be made to correspond to continuous operation of the machine controlled, the notch 75 may be made to correspond to a single stroke operation of the machine, the notch 76 made to correspond to an "inching" operation, and the notched shoulder 78 to correspond to a safety or non-operating position. Assuming that the notch 75 is caused to engage the pin 34 of the operating lever 20, as shown, the link mechanism will be positioned as indicated and the valve actuating arm 12 will assume a pre-set position as shown. If now the foot treadle is stepped upon, or the solenoid 87 energized, the plunger pin 42 will be drawn to the right a sufficient distance to permit of upward movement of the latch block 54 into the notched recess 48, and the plunger pin 42 will be held in this withdrawn position by engagement of the shoulder 130 with the coacting edge of the latch block 54. In this position the valve actuating arm 12 is moved so as to cause the valve piston 122 to be moved to the left, bringing into registration its aperture 124 with the duct 120 and admitting fluid pressure from the pipe 112 into the outlet pipe 110 and thence to the clutch and brake mechanisms. If a connected prime mover is rotating this will therefore cause rotation of the machine being controlled, which in turn will drive the cam 64 in a suitable direction, as for example a clockwise direction as indicated by the arrow on the cam 64. As the high part of the cam rotates it will engage the cam face 60 of the cam-engaging block 58, forcing the latch pin 52 downwardly a sufficient distance to release the held plunger pin 42, and the lower fluid valve plunger 122 will then be returned to its cut-off position and the upper fluid valve plunger 123 will be moved slightly to the left, bringing its aperture 124 into registration with the exhaust duct 126, thereby exhausting any pressure remaining in the clutch and brake mechanisms after the cut-off. The machine will therefore stop, and it will be obvious that it will stop within predetermined limits, that is, after one revolution of the shaft 66, which may be the main crank shaft, in which case the machine is always stopped after one complete operation.

If now the notch 74 is caused to engage the pin 34 of the operating lever 20 the fluid valve will be retained in its open position, that is the aperture 124 of the lower piston 122 will be held fully in registration with the connecting duct 120, and the clutch 104 will remain in continuous engagement, causing the machine to rotate until the notch 74 is disengaged from the pin 34, whereupon the spring 84 returns the valve to the cut-off and exhaust positions. The downward movement of the latch pin 52 will not release the latch plunger pin 42 as long as the notch 74 is engaged, as the shoulder 130 is to the right of the latch block 54 in this position.

If now the notch 76 is caused to engage the pin 34, it will be seen that upon pressing the foot treadle 22, or energizing the solenoid 87, the stop 28 prevents the plunger pin 42 from being drawn a sufficient distance to the right to permit locking between the shoulder 130 and the latch block 54, and the valve 10 is open only partially and remains open only so long as the foot treadle is held down. Release of the foot treadle closes the intake port and brings the aperture 124 in the piston 123 into registration with the exhaust duct 126, thereby quickly and completely exhausting the pressure in the line 110. This permits of "inching" of the machine controlled by intermittent pressure on the foot treadle 22 or by intermittently energizing the solenoid 87.

When the notched shoulder 78 engages the pin 34 the plunger pin 42 remains at its extreme left position, the stop lever 24 is forced up against the stop bolt 28, and the pedal 22 is held in its depressed position. It is therefore impossible to admit fluid pressure to the clutch by pressure of the foot treadle, or by energizing the solenoid 87. The piston 123 now has its aperture 124 fully in registration with the exhaust duct 126.

It will thus be seen that the object of the notches 74, 75 and 76 is to pre-set the initial position of the fluid control valve by also initially pre-setting the plunger pin 42, so that it will or will not be engaged by the latch block 54 when the foot treadle 22 is pressed or the solenoid 87 is energized. Since the operating arm 20 is shown as having a fixed limited movement the pre-set conditions are definite for each notch and the plunger pin 42 is always moved the same distance to the right when the foot treadle is actuated or the solenoid energized.

Figure 4:
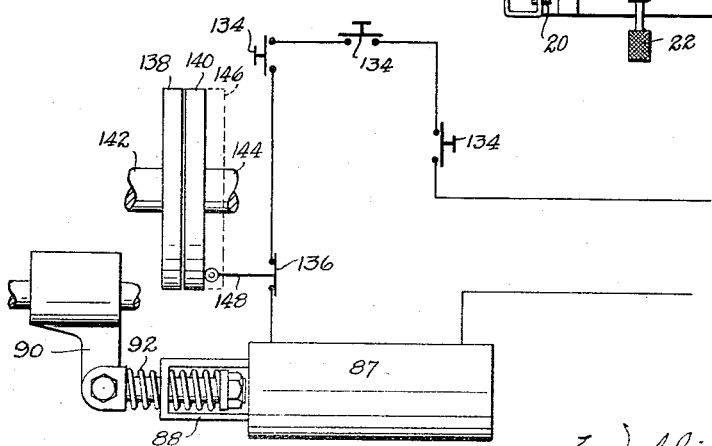
Fig. 4 is a diagrammatic representation of one method of providing a safety control in connection with my invention.

When the link mechanism is controlled by energization of the solenoid 87 a plurality of normally open push buttons 134 (Fig. 4) may be placed in the energizing circuit, the number corresponding to the number of operators attending the machine, or the number of stations from which it may be desired to stop and start the machine, whereupon it is seen that each normally open button or switch must be closed before energization of the solenoid 87 is effected. These buttons or switches may be placed at some suitable point away from the machine so as to insure that each operator is clear of the machine before it is caused to operate. Of course, only one button may be used if this feature is unnecessary or not desired.

Also a suitable mechanism may be arranged in connection with the machine controlled to open a normally closed push button 136 upon the occurrence of an abnormality in the operation of the machine, such for example as a clogging or jamming of work pieces in gripper dies. The mechanism for opening this push button may be any of a number of well known mechanisms. I have diagrammatically indicated one such in Fig. 4 as comprising two flange members 138 and 140. The flange 138 may be rigid with a shaft 142 connected with the main actuating or driving shaft of the machine, while the flange 140 may be rigid with another shaft 144 connected with the gripping or forming dies of the machine. These flanges 138 and 140 may have a connecting mechanism such that upon undue resistance being offered by the shaft 144 the flange 140 is caused to move away from the flange 138 somewhat as is indicated in dotted lines at 146, and thereby actuate the arm 148 to open the switch or push button 136, which will deenergize the solenoid 87 permitting the link mechanism to return the fluid controlling valve to its cut-off position.

In the operation of large metal forming machines having a brake to effect stopping it is known that the brake is not as effective when cold as when hot and as a result when cold the machine will drift or coast by a desired stopping point. To provide for accurate stopping under both hot and cold conditions some form of compensation is required. This compensation is provided for in this invention by the rotation of the cam engaging block 58 through 180° as already described. When the block is in the position indicated in solid lines and the cam 64 is rotating in a clockwise direction it is obvious that it will be engaged later than in the position indicated in dotted lines. The solid line position may be used when operating a machine normally, and the dotted line position when operating a machine when the brake is cold. When properly used a machine may be caused to always stop substantially at a given point, for example when a heading ram is on dead center in its withdrawn position.

Another method of providing this compensation is to make the cam 64 relatively adjustable with respect to the shaft 66 by separating it from its supporting hub member 151 and backing up plate 150 (see Fig. 2) and providing adjustable connections therewith, so that the high part of the cam may be advanced or retarded, as desired. In such an arrangement it is possible, of course, to dispense with the 180° rotation of the cam block 58, or use this movement in conjunction with adjustment of the cam.

In the embodiment illustrated I have specifically shown the treadle rod 70 as having a variable connection with the operating lever 20 through the notches 74, 75 and 76. It will be obvious, however, that I may obtain a like result by making the connection between the treadle rod 70 and the operating lever 20 a fixed one and either making the stop arm 24 relatively adjustable with respect to the operating lever 20, so that the lever 20 may have several pre-set positions, or by substituting for the rigid stop face 32 and stop bolt 28 an adjustable stop face and stop bolt, so that in either event a pre-setting of the latch plunger pin 42 may be accomplished, as is now done by varying the connection between the treadle rod 70 and the operating lever 20. The essential characteristic of either arrangement is that a means be provided for initially positioning the plunger pin 42, and the parts connected therewith, in the relative positions heretofore described to control the operation of a machine in the manner set out. I therefore do not wish to be limited to the specific arrangement shown for effecting the pre-set conditions enumerated.

While I have described an embodiment of my invention with particular reference to controlling a fluid actuated clutch and brake, it will be apparent to those skilled in the art that by simple modifications the same general mechanism may be used to control a mechanically or electrically actuated clutch and brake. Therefore in the appended claims wherever the word "valve" or "fluid controlling valve", or similar expressions are used I wish it to be understood that such words are intended to include any form of energy controlling means, as for example suitably arranged electrical contacts.

Such other embodiments as come within the spirit and scope of the appended claims are also intended to be included in this invention.

I claim:

1. A timing mechanism comprising an energy controlling fluid actuated clutch and valve therefor, means urging the valve closed, means for opening the valve, means holding the valve open, and means releasing the holding means after a predetermined interval of time to permit the valve to close by said first mentioned means.

2. In a timing mechanism the combination of a fluid clutch, a controlling valve therefor, actuating means, a link connecting said valve and actuating means, and means associated with said link for effecting definite variable connections between said actuating means and valve.

3. In a timing mechanism the combination of a fluid clutch and controlling valve therefor, an actuating means, a link connecting said valve and means, a latch mechanism associated with said link, said latch mechanism being adapted to engage and hold said link when moved in one direction, and means for tripping said latch mechanism after a predetermined interval of time.

4. A timing mechanism for a metal forming machine having in combination a fluid actuated clutch, a fluid valve having open and closed positions for controlling said clutch, an operating lever, a link connecting the valve and lever, means varying the length of the link, a latch associated with the link, means engaging the latch when the lever is operated to hold the valve in its open position, and means tripping the latch after a predetermined operation of said machine.

5. The combination with a metal forming machine and a fluid actuated clutch, of a fluid controlling valve therefor, means for locking said valve in one position, and means responsive to an operation of said machine for releasing said locking means.

6. The combination of a fluid actuated clutch and controlling valve therefor, an actuating lever having a predetermined fixed limited movement, a link connecting said lever and valve, and means associated with said link for effecting pre-established variable connections with said lever.

7. The combination of a fluid actuated clutch, a controlling valve therefor, an actuating means, a mechanism connecting said valve and means and including a plurality of predetermined settings, means normally urging said mechanism in one direction, and means holding said mechanism against said urging means when moved in another direction, and means releasing said mechanism after a predetermined interval of time.

8. In a timing mechanism the combination of a fluid operated clutch, a valve controlling fluid to said clutch, a mechanism for controlling opening and closing of said valve including means for effecting intermittent or continuous operation, and means for initially presetting said mechanism.

9. The combination of a fluid actuated clutch, a valve controlling fluid to said clutch, a link mechanism controlling said valve, means associated with said link mechanism for presetting the initial position of said valve, and means for locking said valve in one position for a predetermined interval of time to actuate said clutch, and means for subsequently releasing said valve to release said clutch.

10. In a timing mechanism the combination with a fluid actuated clutch, and a fluid actuated brake, of a fluid valve controlling fluid to the clutch and brake, controlling means including a latch mechanism for the fluid valve, means cooperating with said latch mechanism to restrain said valve in open position for one operation of said controlling means, and means automatically acting upon said last mentioned means after a predetermined length of time to close said valve.

11. In a timing mechanism the combination of a fluid controlling valve, an actuating means, a link mechanism connecting said valve and means, a latch mechanism associated with said link mechanism, said latch mechanism being adapted to engage and hold said link when moved in one direction, means for disengaging said latch mechanism after a predetermined interval of time, and means for varying said time to compensate for temperature variations.

WILLIAM W. CRILEY.